(12) United States Patent
Durham et al.

(10) Patent No.: US 8,954,448 B1
(45) Date of Patent: Feb. 10, 2015

(54) PRESENTING CONTENT RELATED TO CURRENT MEDIA CONSUMPTION

(75) Inventors: Scott Durham, Seattle, WA (US); Paul William Roberts, Seattle, WA (US); Scott K. Meaker, Seattle, WA (US); Jim L. Dantzler, Newcastle, WA (US); Randall E. Moss, Seattle, WA (US); Erin O. Anderson, Seattle, WA (US); Benjamin J. Shepherd, Issaquah, WA (US)

(73) Assignee: Amazon Technologies, Inc., Seattle, WA (US)

( * ) Notice: Subject to any disclaimer, the term of this patent is extended or adjusted under 35 U.S.C. 154(b) by 258 days.

(21) Appl. No.: 13/222,480

(22) Filed: Aug. 31, 2011

(51) Int. Cl.
G06F 17/30 (2006.01)

(52) U.S. Cl.
CPC .............................. G06F 17/30029 (2013.01)
USPC ............ 707/748; 707/723; 707/752; 707/754

(58) Field of Classification Search
CPC ................................................. G06F 17/30029
See application file for complete search history.

(56) References Cited

U.S. PATENT DOCUMENTS

| | | | | |
|---|---|---|---|---|
| 8,180,770 | B2* | 5/2012 | Ranasinghe et al. | 707/732 |
| 2003/0018709 | A1* | 1/2003 | Schrempp et al. | 709/203 |
| 2006/0265421 | A1* | 11/2006 | Ranasinghe et al. | 707/104.1 |
| 2007/0048712 | A1* | 3/2007 | Plastina et al. | 434/308 |
| 2007/0100690 | A1* | 5/2007 | Hopkins | 705/14 |
| 2008/0091722 | A1* | 4/2008 | Wendelrup | 707/104.1 |
| 2008/0109306 | A1* | 5/2008 | Maigret et al. | 705/14 |
| 2008/0147711 | A1* | 6/2008 | Spiegelman et al. | 707/102 |
| 2009/0006321 | A1* | 1/2009 | Kaiser et al. | 707/2 |
| 2010/0162149 | A1* | 6/2010 | Sheleheda et al. | 715/764 |
| 2011/0066501 | A1* | 3/2011 | Saxena | 705/14.64 |
| 2011/0213769 | A1* | 9/2011 | Handman et al. | 707/722 |
| 2012/0191510 | A1* | 7/2012 | Cameron | 705/12 |
| 2013/0006515 | A1* | 1/2013 | Vellaikal et al. | 701/410 |

OTHER PUBLICATIONS

U.S. Appl. No. 13/036,539 entitled "Metadata-Based File System," which was filed Feb. 28, 2011.
U.S. Appl. No. 13/173,782 entitled "Media Recommendations Based on Media Consumption," which was filed Jun. 30, 2011.
U.S. Appl. No. 13/173,539 entitled "Media Recommendations Based on Playlists," which was filed Jun. 30, 2011.
U.S. Appl. No. 13/173,494 entitled "Media Player Social Network Integration," which was filed Jun. 30, 2011.
U.S. Appl. No. 13/197,479 entitled "Media Recommendations," which was filed Aug. 3, 2011.

* cited by examiner

*Primary Examiner* — Mohammad S Rostami
(74) *Attorney, Agent, or Firm* — Thomas | Horstemeyer, LLP (57) ABSTRACT

Disclosed are various embodiments for presenting content items that are related to media items that are currently being consumed by a user. A media item in a stream of media items being presented to a user is identified. A content item that is relevant to the media item is determined. An entry is added to the entries of a relevant content listing. The entry includes a link to the content item. The entries in the relevant content listing are chronologically correlated to the stream that is being presented to the user. The relevant content listing is updated in a user interface that is being presented to the user.

23 Claims, 6 Drawing Sheets

PRESENTING CONTENT RELATED TO CURRENT MEDIA CONSUMPTION

BACKGROUND

People are often interested in specific genres of media items according to their preferences. For example, a person may prefer to listen to avant-garde classical and free jazz. To this end, the person may purchase compact disc albums of music that may be categorized as avant-garde classical or free jazz. Such a person may be unlikely to purchase compact disc albums of country music.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

DETAILED DESCRIPTION

The present disclosure relates to presenting content that is related to the current media consumption of a user. For example, a user may be listening to a music stream over the Internet, a radio station through speakers, or to other media content through another media source. In some cases, a user may be consuming media files that are stored in a networked storage system in a file system associated with the user. The user may play the media files through a smartphone, a laptop computer, a desktop computer, and/or other types of client computing devices.

Various embodiments of the present disclosure present content that is related to the media item that the user is currently consuming. The media item that is currently being consumed is identified, and content that is related to the media item is determined. In one embodiment, the related content is presented in a feed-style format in a panel of a user interface of a client. A media player user interface may be provided in connection with the feed of related content, and the feed may be chronologically correlated to media items presented through the media player. In some embodiments, an electronic commerce system may facilitate purchase of the related content. In the following discussion, a general description of the system and its components is provided, followed by a discussion of the operation of the same.

Figure 1:
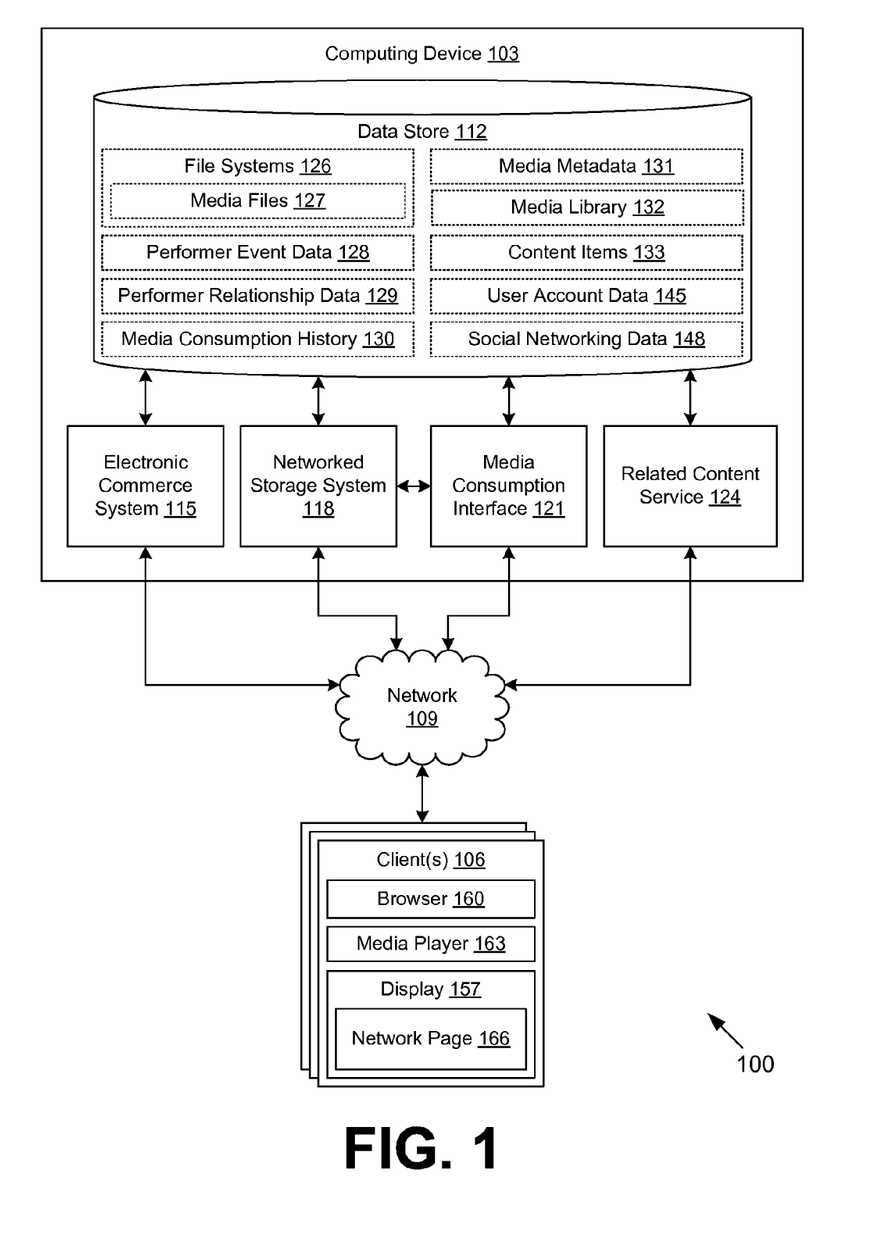
FIG. 1 is a drawing of a networked environment according to various embodiments of the present disclosure.

With reference to FIG. 1, shown is a networked environment 100 according to various embodiments. The networked environment 100 includes one or more computing devices 103 in data communication with one or more clients 106 by way of a network 109. The network 109 includes, for example, the Internet, intranets, extranets, wide area networks (WANs), local area networks (LANs), wired networks, wireless networks, or other suitable networks, etc., or any combination of two or more such networks.

The computing device 103 may comprise, for example, a server computer or any other system providing computing capability. Alternatively, a plurality of computing devices 103 may be employed that are arranged, for example, in one or more server banks or computer banks or other arrangements. For example, a plurality of computing devices 103 together may comprise a cloud computing resource, a grid computing resource, and/or any other distributed computing arrangement. Such computing devices 103 may be located in a single installation or may be distributed among many different geographical locations. For purposes of convenience, the computing device 103 is referred to herein in the singular. Even though the computing device 103 is referred to in the singular, it is understood that a plurality of computing devices 103 may be employed in the various arrangements as described above.

Various applications and/or other functionality may be executed in the computing device 103 according to various embodiments. Also, various data is stored in a data store 112 that is accessible to the computing device 103. The data store 112 may be representative of a plurality of data stores 112 as can be appreciated. The data stored in the data store 112, for example, is associated with the operation of the various applications and/or functional entities described below.

The components executed on the computing device 103, for example, include an electronic commerce system 115, a networked storage system 118, a media consumption interface 121, a related content service 124, and other applications, services, processes, systems, engines, or functionality not discussed in detail herein. The electronic commerce system 115 is executed in order to facilitate the online purchase of related content such as related content items over the network 109. The electronic commerce system 115 also performs various backend functions associated with the online presence of a merchant in order to facilitate the online purchase of media items. For example, the electronic commerce system 115 may generate network pages or portions thereof that are provided to clients 106 for the purposes of selecting media items and/or other items for purchase, rental, download, lease, or other forms of consumption.

The networked storage system 118 is executed to maintain a file hierarchy of files and folders in networked or metadata-based file systems for users. The networked storage system 118 may be regarded as maintaining a file system for each of the users of the system. To this end, the networked storage system 118 may support various file-related operations such as, for example, creating files, deleting files, modifying files, setting permissions for files, downloading files, and/or other operations. The networked storage system 118 may be configured to maintain a record of file activity, e.g., uploading of files, downloading of files, deletion of files, preview of files, etc. The networked storage system 118 may be configured to serve up data addressed by uniform resource locator (URL) via hypertext transfer protocol (HTTP).

In some embodiments, the networked storage system 118 may correspond to a virtual file system where the actual data objects of the files are stored in a separate data storage system.

A metadata service may be used to associate metadata with the files, thereby facilitating searches of the files using the metadata. By storing files in such a networked storage system 118, users may access the files from any client 106 with connectivity to the network 109.

A metadata service may be executed in association with or as part of the networked storage system 118 to maintain metadata items in association with files. To this end, such a metadata service may support various operations such as, for example, creating metadata items, deleting metadata items, retrieving metadata items, searching on metadata items, and/or other operations. The metadata service may also implement one or more searchable indices of the metadata items. It is noted that the networked file system associated with each user storage account in the networked storage system 118 may be a metadata-based file system such as that described by U.S. patent application Ser. No. 13/036,539 entitled "METADATA-BASED FILE SYSTEM," which was filed on Feb. 28, 2011 and is incorporated herein by reference in its entirety.

The media consumption interface 121 is executed to serve up media files stored in the networked storage system 118 to clients 106. The media consumption interface 121 may include a commercially available HTTP server such as, for example, Apache® HTTP Server, Apache® Tomcat®, Microsoft® Internet Information Services (IIS), etc. The media consumption interface 121 may generate one or more network pages, such as web pages, to facilitate selection and consumption of media files. In various embodiments, the media consumption interface 121 may serve up code that functions as an embedded audio player, video player, image viewer, etc. in order for the user to consume the media items.

Multiple media consumption interfaces 121 may be provided for different platforms of clients 106. For example, one media consumption interface 121 may provide an interface for tablet computers, while another media consumption interface 121 may provide an interface for network-enabled televisions. In one embodiment, the media consumption interface 121 may facilitate consumption of media items through various other media channels and/or subscriptions. In some cases, a client 106 may be configured to identify user media consumption associated with other channels (e.g., radio stations, streaming audio, ambient music, ambient video, etc.) and report the media consumption back to the media consumption interface 121.

The related content service 124 is executed to determine content items that are related or relevant to the media items that are being consumed by the user. To this end, the related content service 124 may examine metadata associated with the media items and determine content items having similar metadata, e.g., same or similar genres, performers, instruments, tempos, reviews, locations, etc. For example, the related content service 124 may identify performers associated with the media item. The related content service 124 may then identify other content associated with the performers, or perhaps even other performers associated with those performers. The related content service 124 may also act upon various other information about the user such as, location of the user, demographic data, media consumption history, etc., to identify relevant content.

The data stored in the data store 112 includes, for example, file systems 126, media files 127, performer event data 128, performer relationship data 129, media consumption history 130, media metadata 131, a media library 132, content items 133, user account data 145, social networking data 148, and potentially other data. The file systems 126 correspond to user file systems that are maintained by the networked storage system 118. The media files 127 correspond to various forms of media that may be owned and stored by a user in a file system 126 of the networked storage system 118. Such media files 127 may include, for example, images, music files, audio books, video clips, movies, and so on. The file systems 126 may also include data and files other than the media files 127.

In one embodiment, the media files 127 are stored in various storage buckets of the networked storage system 118. Where the same media file 127 is stored for multiple users in different file systems 126, the same data may be referred to by each of the different file systems 126. If the copy of the media file 127 is modified, the media file 127 may then be replicated (e.g., a "copy-on-write" system). In other embodiments, a separate copy of the media file 127 may be maintained for each different file system 126.

The performer event data 128 may include data describing events of performers at various locations. As used herein, "performer" may refer to an artist, actor, band, group, band member, vocalist, author, and/or any other person or group of persons responsible for creating various media items. The performer events described in performer event data 128 may include book signings, concerts, question and answer sessions, public appearances, and/or other events.

The performer relationship data 129 describes a plurality of relationships among a plurality of performers. As a non-limiting example, a drummer in one band may also be a drummer in another band, and a relationship may be described between the two bands and between the drummer and the two bands. As another non-limiting example, an author may be a co-author with another author on one or more books. Thus, a relationship may be described between the two authors.

The media consumption history 130 includes a log or record of media consumption events associated with a user. In various embodiments, a media consumption event may be generated by the networked storage system 118 and/or the media consumption interface 121 in response to a user consuming one of the media files 127 in the file system of the user. A media consumption event may relate to a full consumption of the media item (e.g., an entire music file was played out) and/or a partial consumption of the media item (e.g., only the first minute of the music file was played out). A consumption of a media file 127 may be explicitly confirmed by the client 106 or may be inferred by the media consumption interface 121 by a lack of errors in transferring the media file 127 to the client 106. Each media consumption event in the media consumption history 130 may be associated with a time of consumption (including start and/or end times), a location of the client 106 during the consumption, a type of client 106 used for the consumption, and/or other data.

The media metadata 131 may include metadata about the various media files 127, e.g., genres, performers, discographies, etc. The media library 132 relates to media items that are available to be presented to the user as related content items. In one embodiment, the media library 132 may correspond to media items that are available for purchase by the user through the electronic commerce system 115. The media library 132 may include items of media content that correspond to media files 127 stored by users. The media metadata 131 may include hashes or other forms of digital fingerprints in order to identify the items of media content in the media library 132 and the media files 127.

The content items 133 correspond to items of content that may be presented to users in conjunction with current media consumptions. The content items 133 may include, for example, news events, album covers, lyrics, reviews, editorials, photos, discographies, biographies of performers, upcoming concert descriptions, alternate versions, etc. In some cases, the content items 133 may correspond to other media items in the media library 132. The content items 133 may, for example, correspond to user-submitted content, content generated by a publisher of a media item, and/or other content.

The user account data 145 may include information about users with which the file systems in the networked storage system 118 are associated. The user account data 145 may also include information about user accounts with the electronic commerce system 115. Such information may comprise, for example, name, address, payment instruments, and other information. Account settings may be employed to specify and track various settings and other functionality with respect to a given account such as passwords, security credentials, file management permissions, storage quotas and limitations, authorized access applications, billing information, and/or other data. The user account data 145 may also include profile or demographic data associated with users.

The social network data 148 may indicate relationships of users of the networked storage system 118 on one or more social networks. Non-limiting examples of social networks include Facebook®, Twitter®, MySpace®, and others. For example, a group of users may correspond to the contacts, "friends," or "followers" of a user on a social network. Such relationships may be symmetrical or asymmetrical. The social network data 148 may be obtained by the related content service 124 and/or another application from systems of the social network and/or other systems.

The client 106 is representative of a plurality of client devices that may be coupled to the network 109. The client 106 may comprise, for example, a processor-based system such as a computer system. Such a computer system may be embodied in the form of a desktop computer, a laptop computer, personal digital assistants, cellular telephones, smartphones, set-top boxes, music players, web pads, tablet computer systems, game consoles, electronic book readers, or other devices with like capability. The client 106 may include a display 157. The display 157 may comprise, for example, one or more devices such as cathode ray tubes (CRTs), liquid crystal display (LCD) screens, gas plasma-based flat panel displays, LCD projectors, or other types of display devices, etc.

The client 106 may be configured to execute various applications such as a browser 160, a media player 163, and/or other applications. The browser 160 may be executed in a client 106, for example, to access and render network pages, such as web pages, or other network content served up by the computing device 103 and/or other servers, thereby rendering a network page 166 on the display 157. The media player 163 is executed to play media files 127 obtained through the media consumption interface 121 of the computing device 103.

The media player 163 may be a stand-alone application, a plug-in for the browser 160, or merely code included within a network page 166 served up by the media consumption interface 121. The media player 163 is further configured to render a user interface that presents a relevant content listing in relation to the current media consumption. In some cases, the relevant content listing may be presented even if no media files 127 are being played by the media player, e.g., if the user is listening to media items through alternate channels. The client 106 may be configured to execute applications beyond the browser 160 and the media player 163 such as, for example, email applications, instant message applications, and/or other applications.

Next, a general description of the operation of the various components of the networked environment 100 is provided.

To begin, a user establishes an account with the networked storage system 118 and, optionally, the electronic commerce system 115. The user begins populating a file system of the networked storage system 118 with media files 127. The user may upload previously acquired media files 127. The user may also purchase media files 127 from the media library 145 through the electronic commerce system 115, which are then automatically stored into the networked storage system 118 for the user.

The user is able to download and/or stream media files 127 from the networked storage system 118 through the media consumption interface 121. Such consuming of media files 127 may take place in many different contexts. As a non-limiting example, a user may be commuting to work on a train and listening to media files 127 through a media player 163 executed in a smartphone. As another non-limiting example, the user may be at work and listening to media files 127 through a desktop workstation. As yet another non-limiting example, the user may be at the gym and listening to media files 127 through the smartphone. As yet another non-limiting example, the user may be at home and listening to media files 127 through a network-enabled home stereo. As a result of any such consumption experience, media consumption history 133 may be generated.

The media consumption interface 121 is configured to present a listing of relevant or related content items 133 in conjunction with the playback of media files 127. In some embodiments, the listing of relevant or related content items 133 may be presented in conjunction with presentation of a stream of media items, which may occur through the client 106 or the client 106 may detect the stream of media items in the environment (e.g., detecting ambient content through digital signatures, etc.). The identification may then be sent from the client 103 to the media consumption interface 121. It is noted that identification may be partly or wholly performed by the media consumption interface 121. Once the media item or media file 127 that is currently being consumed by the user is identified, the related content service 124 is able to determine content items 133 that are relevant or related. In some embodiments, the content items 133 that are relevant or related may be determined in advance of consumption/presentation of the media items or media files 127.

The content items 133 that are relevant may be determined through a variety of approaches or factors. For example, media metadata 131 may be searched to find content items 133 that are linked to various metadata fields. Content items 133 associated with the same performer, genre, publisher, album, track, etc. may be considered relevant in various situations. Additionally, performer relationship data 129 may be consulted to determine performers that are related to one another in some way. Social networking data 148 may be consulted to find content items 133 that interest friends of the user, and such content items 133 may be surfaced if relevant to the current media item or media file 127.

In various embodiments, the related content service 124 may compute a relatedness score between a content item 133 and a media file 127 so that only highly related content items 133 (e.g., with a relatedness score meeting a predefined minimum threshold) are surfaced to users. The current location of the user may be a significant factor in surfacing content items 133. For example, a content item 133 may correspond to a concert or other live event described by the performer event data 128. The location and current time may determine whether the concert content item 133 is to be presented to the user. A predefined radius or threshold may be used to determine whether to surface such a live event to the user. As non-limiting examples, if the concert were 500 miles away, it might not be presented, but if the concert were just 20 miles away, it might be presented. In addition, media consumption history 130 of the user may factor in to which content items 133 are surfaced.

In some cases, relevant content items 133 may be determined based at least in part upon media consumption histories 130 of multiple users who are within a geographic area associated with the location of the user. For example, it may be the case that fans of a particular band who live on the west coast may prefer to listen to certain songs by that band, while fans of the band who live on the east coast may prefer to listen to certain other songs of that band. If the user is determined to be on the east coast, the location may affect which songs of the band are deemed relevant/related to a current media file 127.

If related, relevant content items 133 are found by the related content service 124, the media consumption interface 121 may then send data describing the relevant content items 133 to the client 106 by way of the network 109. The relevant content items 133 may include media items from the media library 132. In various embodiments, the relevant content items 133 may be presented by way of a feed window or panel with various entries corresponding to the relevant content items 133. The entries in the feed window may be sequenced or chronologically correlated according to the media items or media files 127 that have been consumed by the user.

Updates to the feed window may be delayed in order to avoid updating the feed window too frequently. Frequent updates may distract or annoy the user. For example, updates to the feed window may be configured to occur no more frequently than every 20 seconds, 90 seconds, or some other time interval. In some case, the entries in the feed window may include a thumbnail image or icon associated with the content item 133.

Various techniques relating to recommendations and media consumption are described in U.S. patent application Ser. No. 13/173,782 entitled "MEDIA RECOMMENDATIONS BASED ON MEDIA CONSUMPTION," which was filed on Jun. 30, 2011, U.S. patent application Ser. No. 13/173,539 entitled "MEDIA RECOMMENDATIONS BASED ON PLAYLISTS," which was filed on Jun. 30, 2011, U.S. patent application Ser. No. 13/173,494 entitled "MEDIA PLAYER SOCIAL NETWORK INTEGRATION," which was filed on Jun. 30, 2011, U.S. patent application Ser. No. 13/197,479 entitled "MEDIA RECOMMENDATIONS," which was filed on Aug. 3, 2011, all of which are incorporated herein by reference in their entirety.

Figure 2A:
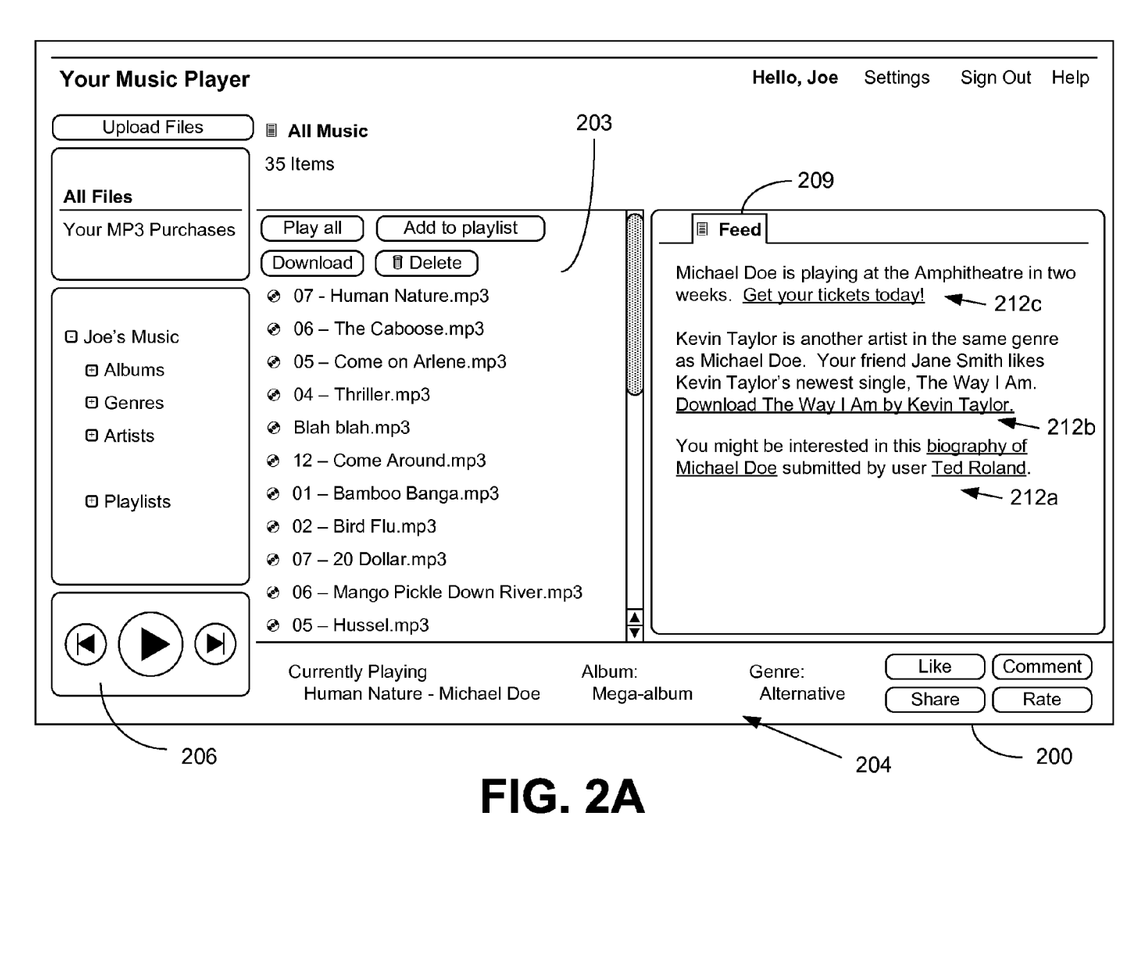
FIGS. 2A and 2B are drawings of examples of user interfaces rendered by a client in the networked environment of FIG. 1 according to various embodiments of the present disclosure.

Referring next to FIG. 2A, shown is an example of a user interface 200 rendered in a client 106 (FIG. 1) in the networked environment 100 (FIG. 1). The user interface 200 may be rendered by the browser 160 (FIG. 1), the media player 163 (FIG. 1), a mobile application, or another application. The user interface 200 includes a listing 203 of media files 127 (FIG. 1) stored in a file system 126 (FIG. 1) of the user. The media files 127 shown in the listing 203 may be all media files 127 in the respective file system 126, all media files 127 within one or more folders of the respective file system 126, the media files 127 which are within a user-configured or automatically generated playlist, and/or other collections of media files 127. The listing 203 may facilitate performing various actions such as selecting which media files 127 are to be consumed, downloading media files 127 to the client 106, deleting media files 127 from the file system 126, and/or other functions.

A status panel 204 displays various information about a media file 127 that is currently being consumed such as, for example, title, artist, album, genre, and so on. The status panel 204 may include components for the user to indicate an interest in the media file 127, to comment on the media file 127, to share the media file 127 with others on a social network, to rate the file, and/or to perform other actions relative to the currently selected media file 127. A media player control panel 206 may be provided to control playback/consumption of media files 127 through the media player 163. The media player control panel 206 may include components for starting, stopping, pausing, moving to the next media file 127 in a playlist, moving to the previous media file 127 in a sequence, and/or performing other functions.

A feed panel 209 may be rendered alongside the listing 203 or in another location in conjunction with the listing 203. The feed panel 209 includes a listing of content items 133 (FIG. 1) that are deemed relevant or related to the currently consumed media file 127 by the related content service 124 (FIG. 1). Each entry 212 in the feed panel 209 may correspond to a respective relevant content item 133. Each entry 212 includes a link to the content item 133 or to a network page 166 (FIG. 1) or other screen that provides additional information about the content item 133.

In the non-limiting example of FIG. 2A, the media file 127 with the file name "07-Human Nature.mp3" is currently being played or queued to be played by the media player 163. The status panel 204 indicates that the title is "Human Nature" and the artist is "Michael Doe." The status panel 204 also indicates that the album title is "Mega-album" and the genre is "Alternative." Such information may be determined from metadata associated with the media file 127 in the file system 126 and/or the media metadata 131 (FIG. 1).

In this non-limiting example, three entries 212a, 212b, and 212c are presented in the feed panel 209. Entry 212a recommends a user-submitted biography of the artist of the currently selected media file 127. A link is provided to access the biography, e.g., through another window of the browser 160 or the media player 163. The source of the content item 133 (e.g., a user, the performer, the producer, etc.) may or may not be indicated in the feed panel 209 in various embodiments. In one embodiment, the identity of the source user who provided the content item 133 may be indicated if the source user is a friend of the current user in a social network according to the social networking data 148 (FIG. 1). A link may be provided to access the profile of the source user through the social network.

Entry 212b recommends another media file 127 by a different artist. The artist is determined according to the performer relationship data 129 as having a relationship to the current artist (i.e., both are in the same genre). The other media file 127 is determined from social networking data 148 that indicates that a friend of the current user has indicated an interest in the other media file 127 by the different artist. A link is provided to download or purchase the other media file 127.

Entry 212c describes a concert (i.e., a performer event) of the artist associated with the currently selected media file 127. The entry 212c indicates that "Michael Doe" is performing at "the Amphitheatre" in "two weeks." The location of the user may be determined, and the performer event data 128 may be employed to identify upcoming concerts and/or other performer events near the location of the user within a predefined time frame. A link may be provided for the user to order tickets for the performer event.

Figure 2B:
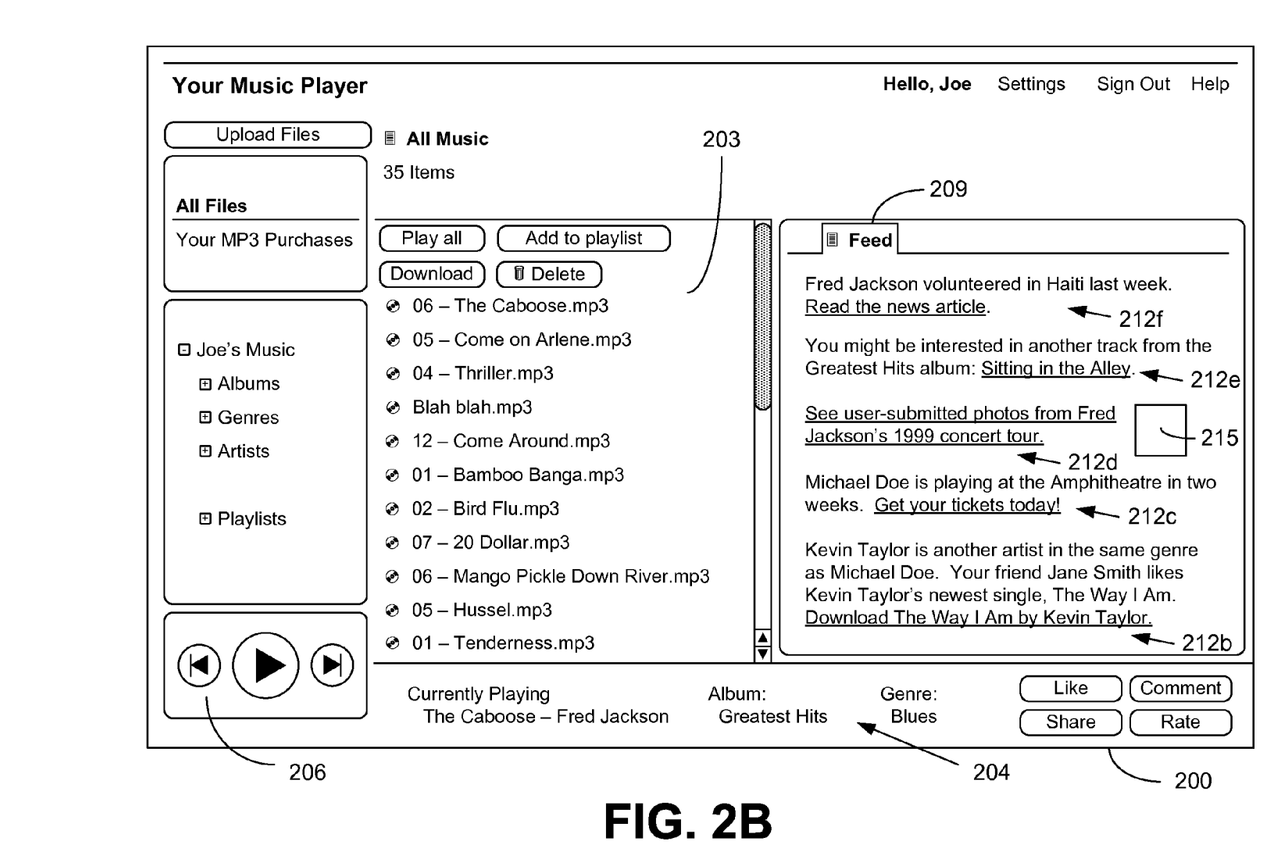

Turning now to FIG. 2B, shown is another example of a user interface 200 rendered in a client 106 (FIG. 1) in the networked environment 100 (FIG. 1). The user interface 200 in FIG. 2B is updated to reflect another currently selected or playing media file 127 (FIG. 1). The status panel 204 has been updated to show that a media file 127 by "Fred Jackson" titled "The Caboose" is currently selected. The album is indicated to be "Greatest Hits," with a genre of "Blues." In addition, the listing 203 of media files 127 is advanced from the media file 127 that was selected in FIG. 2A to another media file 127 ("06-The Caboose.mp3"), which is now selected/playing in FIG. 2B.

The feed panel 209 is updated to show an additional three entries 212d, 212e, and 212f in the relevant content listing. Entry 212d links to user-submitted photos from associated with the artist "Fred Jackson," that is, photos from "Fred Jackson's 1999 concert tour." A corresponding thumbnail image 215 may be provided for the entry 212d. Entry 212e relates to another media file 127 from the same "Greatest Hits" album. A link for acquiring the other media file 127, titled "Sitting in the Alley" is provided. Entry 212f relates to an article covering a news event related to the artist. In this non-limiting example, the article discusses the artist Fred Jackson volunteering in Haiti last week. A link to the news article is provided.

It is noted that the relevant content listing in the feed panel 209 is chronologically correlated to the media files 127 that are playing and have been played. For example, the entries 212b and 212c that were relevant to the media file 127 that was selected/playing in FIG. 2A are advanced downward in the feed panel 209, and the now-relevant entries 212d, 212e, and 212f are added to the top of the feed panel 209. Also, entry 212a (FIG. 2A) has been scrolled off of the listing. In another example, the now-relevant entries 212d, 212e, and 212f may be added below the formerly relevant entries 212b and 212c. In various embodiments, the entries 212 may be correlated with the sequence by which media files 127 were selected and consumed.

Figure 3:
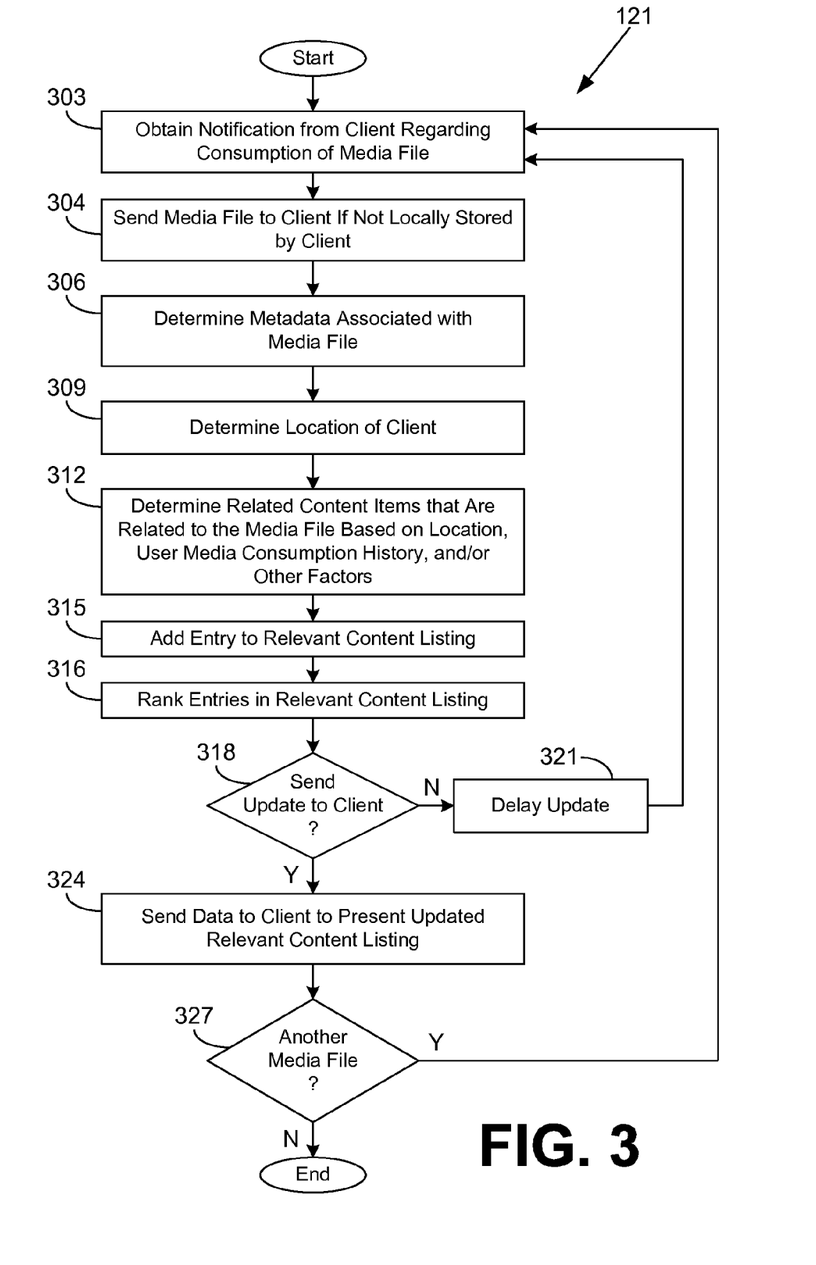
FIG. 3 is a flowchart illustrating one example of functionality implemented as portions of a media consumption interface executed in a computing device in the networked environment of FIG. 1 according to various embodiments of the present disclosure.

Moving on to FIG. 3, shown is a flowchart that provides one example of the operation of a portion of the media consumption interface 121 according to various embodiments. It is understood that the flowchart of FIG. 3 provides merely an example of the many different types of functional arrangements that may be employed to implement the operation of the portion of the media consumption interface 121 as described herein. As an alternative, the flowchart of FIG. 3 may be viewed as depicting an example of steps of a method implemented in the computing device 103 (FIG. 1) according to one or more embodiments.

Beginning with box 303, the media consumption interface 121 obtains a notification from a client 106 (FIG. 1) regarding consumption of a media file 127 (FIG. 1). In one embodiment, this notification may correspond to a request to access the media file 127. In another embodiment, the media consumption interface 121 may instead obtain an indication that a user has consumed a particular media item through another channel, e.g., streaming audio, streaming video, ambient music, etc. In box 304, the media consumption interface 121 sends the media file 127 to the client 106 if the media file 127 is not cached in the client 106 or not otherwise locally stored by the client 106. In box 306, the media consumption interface 121 determines metadata that is associated with the media file 127. The metadata may be stored with the media file 127 in the file system 126 (FIG. 1) or obtained from the media metadata 131 (FIG. 1).

In box 309, the media consumption interface 121 determines the current location of the client 106. For example, geolocation may be employed based on an internet protocol (IP) address of the client 106. Alternatively, the client 106 may send coordinates of a location determined by a global positioning system (GPS) device or other location-finding device of the client 106. In another example, the location may be determined from stored data in the user account data 145 (FIG. 1).

In box 312, the media consumption interface 121 determines content items 133 (FIG. 1) that are related to the media file 127 based at least in part on location of the user, media consumption history 130 (FIG. 1) of the user, performer relationship data 129 (FIG. 1), performer event data 128 (FIG. 1), correlations among metadata, relationships of the user to other users in the social networking data 148 (FIG. 1), and/or other factors. In box 315, one or more entries are added to a relevant content listing for the media file 127. In box 316, the media consumption interface 121 ranks the entries in the relevant content listing, for example, according to a relevance score determined with respect to the media file 127, location of the user, media consumption history 130 of the user, and/or other factors. In some cases, where limited space is available, entries with relatively lower relevance scores may be excluded from the relevant content listing.

In box 318, the media consumption interface 121 determines whether to send an update to the relevant content listing to the client 106. For example, the media consumption interface 121 may be configured to send updates no more than at a predefined time interval between updates. Such a time interval may be a fixed time interval or a variable time interval. Where the time interval is a variable time interval, the media consumption interface 121 may be configured to compute the time interval according to a variety of factors including, for example, an update frequency preference of the user, the media consumption history 130 of the user, and so on. If updates are not to be sent, the media consumption interface 121 moves to box 321 and bundles the update and/or delays the update in order to maintain the minimum time interval between updates. The media consumption interface 121 may then return to box 303 and process a request or identification of another media file 127.

If the media consumption interface 121 determines that the update is to be sent, the media consumption interface 121 moves from box 318 to box 324. In box 324, the media consumption interface 121 sends data to the client 106 to present the updated relevant content listing in a user interface. The relevant content listing may be chronologically correlated with the selection of media items 127 in the client 106.

In box 327, the media consumption interface 121 determines whether another media file 127 is to be processed. If another media file 127 is to be processed, the media consumption interface 121 returns to box 303 and obtains another request or identification of a media file 127. Otherwise, the portion of the media consumption interface 121 ends.

Figure 4:
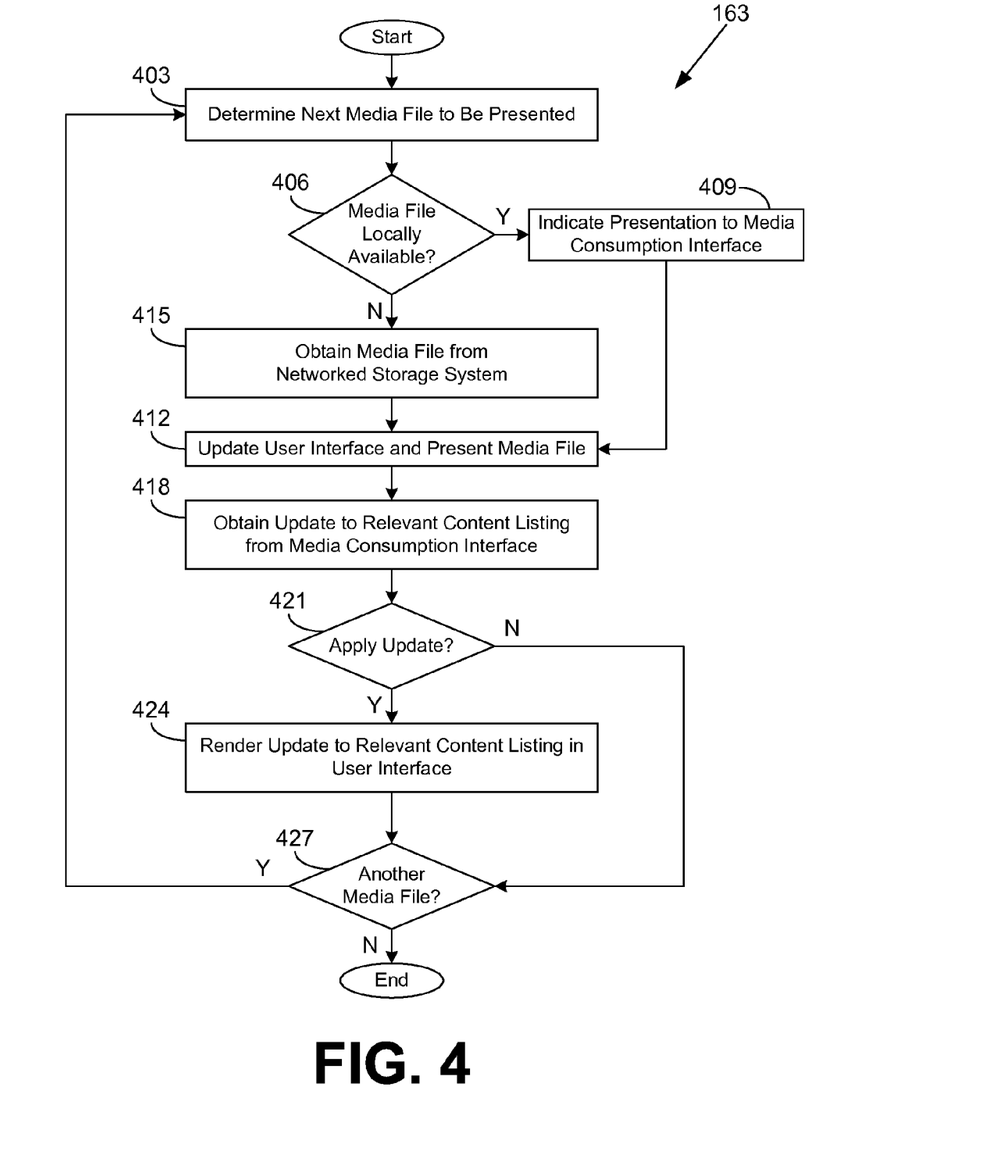
FIG. 4 is a flowchart illustrating one example of functionality implemented as portions of a media player executed in a client computing device in the networked environment of FIG. 1 according to various embodiments of the present disclosure.

Referring next to FIG. 4, shown is a flowchart that provides one example of the operation of a portion of the media player 163 according to various embodiments. In some embodiments, the media player 163 may correspond to code that is executed in a browser 160 (FIG. 1) to generate a user interface. It is understood that the flowchart of FIG. 4 provides merely an example of the many different types of functional arrangements that may be employed to implement the operation of the portion of the media consumption interface 121 as described herein. As an alternative, the flowchart of FIG. 4 may be viewed as depicting an example of steps of a method implemented in the client 106 (FIG. 1) according to one or more embodiments.

Beginning with box 403, the media player 163 determines the next media file 127 (FIG. 1) to be presented. In box 406, the media player 163 determines whether the media file 127 is locally available in the client 106 or otherwise is already available to the user. If the media file 127 is cached in the client 106, the media player 163 indicates a presentation of the media file 127 to the media consumption interface 121 in box 409. The media player 163 then proceeds to box 412. If in box 406, the media player 163 instead determines that the media file 127 is not cached, the media player 163 moves from box 406 to box 415 and obtains the media file 127 from the networked storage system 118 (FIG. 1). The media player 163 then proceeds to box 412.

In box 412, the media player 163 updates the user interface 200 (FIGS. 2A & 2B) and presents the media file 127. In box 418, the media player 163 obtains an update to a relevant content listing from the media consumption interface 121. In box 421, the media player 163 determines whether the update is to be applied. For example, the media player 163 may be configured to enforce a minimum period of time between updates so that the updates are not distracting to the user. If the update is to be applied, in box 424, the media player 163 renders the update to the relevant content listing in the user interface 200. The media player 163 continues to box 427. If the update is not yet to be applied, the media player 163 instead moves from box 421 to box 427.

In box 427, the media player 163 determines whether another media file 127 is to be presented. If another media file 127 is to be presented, the media player 163 returns to box 403 and determines the next media file 127 to be presented. If another media file 127 is not to be presented, the portion of the media player 163 then ends. In one embodiment, any delayed updates to the relevant content listing may then be applied.

Figure 5:
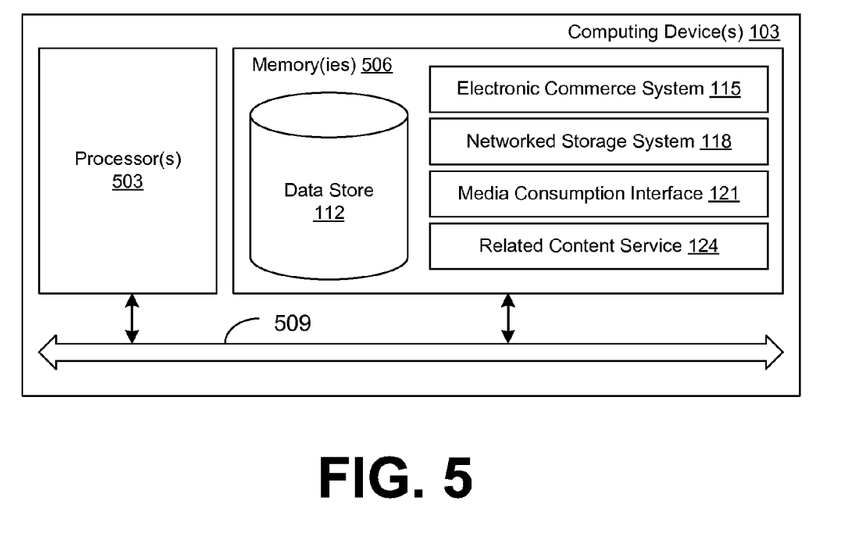
FIG. 5 is a schematic block diagram that provides one example illustration of a computing device employed in the networked environment of FIG. 1 according to various embodiments of the present disclosure.

With reference to FIG. 5, shown is a schematic block diagram of the computing device 103 according to an embodiment of the present disclosure. The computing device 103 includes at least one processor circuit, for example, having a processor 503 and a memory 506, both of which are coupled to a local interface 509. To this end, the computing device 103 may comprise, for example, at least one server computer or like device. The local interface 509 may comprise, for example, a data bus with an accompanying address/control bus or other bus structure as can be appreciated.

Stored in the memory 506 are both data and several components that are executable by the processor 503. In particular, stored in the memory 506 and executable by the processor 503 are the electronic commerce system 115, the networked storage system 118, the media consumption interface 121, the related content service 124, and potentially other applications. Also stored in the memory 506 may be a data store 112 and other data. In addition, an operating system may be stored in the memory 506 and executable by the processor 503.

It is understood that there may be other applications that are stored in the memory 506 and are executable by the processor 503 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Delphi®, Flash®, or other programming languages.

A number of software components are stored in the memory 506 and are executable by the processor 503. In this respect, the term "executable" means a program file that is in a form that can ultimately be run by the processor 503. Examples of executable programs may be, for example, a compiled program that can be translated into machine code in a format that can be loaded into a random access portion of the memory 506 and run by the processor 503, source code that may be expressed in proper format such as object code that is capable of being loaded into a random access portion of the memory 506 and executed by the processor 503, or source code that may be interpreted by another executable program to generate instructions in a random access portion of the memory 506 to be executed by the processor 503, etc. An executable program may be stored in any portion or component of the memory 506 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 506 is defined herein as including both volatile and nonvolatile memory and data storage components. Volatile components are those that do not retain data values upon loss of power. Nonvolatile components are those that retain data upon a loss of power. Thus, the memory 506 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 503 may represent multiple processors 503 and the memory 506 may represent multiple memories 506 that operate in parallel processing circuits, respectively. In such a case, the local interface 509 may be an appropriate network that facilitates communication between any two of the multiple processors 503, between any processor 503 and any of the memories 506, or between any two of the memories 506, etc. The local interface 509 may comprise additional systems designed to coordinate this communication, including, for example, performing load balancing. The processor 503 may be of electrical or of some other available construction.

Although the electronic commerce system 115, the networked storage system 118, the media consumption interface 121, the related content service 124, the media player 163 (FIG. 1), and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The flowcharts of FIGS. 3 and 4 show the functionality and operation of an implementation of portions of the media consumption interface 121 and the media player 163. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 503 in a computer system or other system. The machine code may be converted from the source code, etc. If embodied in hardware, each block may represent a circuit or a number of interconnected circuits to implement the specified logical function(s).

Although the flowcharts of FIGS. 3 and 4 show a specific order of execution, it is understood that the order of execution may differ from that which is depicted. For example, the order of execution of two or more blocks may be scrambled relative to the order shown. Also, two or more blocks shown in succession in FIGS. 3 and 4 may be executed concurrently or with partial concurrence. Further, in some embodiments, one or more of the blocks shown in FIGS. 3 and 4 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the electronic commerce system 115, the networked storage system 118, the media consumption interface 121, the related content service 124, and the media player 163 that comprises software or code can be embodied in any non-transitory computer-readable medium for use by or in connection with an instruction execution system such as, for example, a processor 503 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A non-transitory computer-readable medium embodying at least one program executable in at least one computing device, the at least one program comprising:
   code that maintains a plurality of files in a plurality of virtual file systems that are individually associated with a respective user, at least some of the plurality of files corresponding to a plurality of media files owned by the respective user;
   code that sends at least two of the plurality of media files in one of the plurality of virtual file systems to a client associated with the respective user for playback in the client;
   code that identifies a first performer associated with a current one of the plurality of media files being played in the client;
   code that identifies a second performer based at least in part on the first performer and relationship data that describes a plurality of relationships among a plurality of performers;
   code that identifies a current location of the respective user;
   code that determines at least one content item that is relevant to the current one of the plurality of media files based at least in part on the second performer and the current location of the respective user, wherein the at least one content item corresponds to a live event associated with the second performer at a location that is within a predefined radius of the current location of the respective user; and
   code that sends at least one update to a relevant content listing rendered in the client in response to the current one of the plurality of media files playing in the client, the at least one update being configured to add at least one entry to the relevant content listing, the at least one entry including a link to the at least one content item, the at least one entry in the relevant content listing arranged in a time-based sequence such that the at least one entry correlates to a sequence of playback in the client of the plurality of media files from the one of the plurality of virtual file systems.

2. The non-transitory computer-readable medium of claim 1, wherein the code that sends the at least one update is configured to delay sending the at least one update to ensure a minimum predefined time interval between updates to the relevant content listing.

3. A method, comprising:
   identifying, in at least one computing device, a media item being played from a stream of media items being presented to a user;
   accessing, in the at least one computing device, relationship data that describes a plurality of relationships among a plurality of performers;
   identifying, in the at least one computing device, a first performer associated with the media item;
   identifying, in the at least one computing device, a second performer having a relationship to the first performer based at least in part on the relationship data;
   determining, in the at least one computing device, at least one content item that is relevant to the media item and is associated with the second performer;
   adding, in the at least one computing device, at least one entry to a plurality of entries in a relevant content listing in response to the media item currently being played, the at least one entry including a link to the at least one content item, the plurality of entries in the relevant content listing being arranged in a time-based sequence such that the at least one entry correlates to a sequence of the stream of media items that is being presented to the user;
   updating, in the at least one computing device, the relevant content listing in a user interface being presented to the user, wherein updating the relevant content listing is performed responsive to detecting, in the at least one computing device, that at least an interval of time has elapsed since the relevant content listing was previously updated; and sending, in the at least one computing device, data implementing a media player user interface, the media player user interface being configured to render the relevant content listing in a first panel and a media file playlist in a second panel.

4. The method of claim 3, wherein the interval of time is a variable interval of time.

5. The method of claim 4, further comprising determining, in the at least one computing device, the interval of time according to at least one factor selected from a group consisting of: an update frequency preference of the user and a media consumption history of the user.

6. The method of claim 3, wherein the at least one content item corresponds to user-generated content.

7. The method of claim 3, wherein the at least one content item corresponds to content generated by a publisher of the media item.

8. The method of claim 3, further comprising:
identifying, in the at least one computing device, a current location of the user; and
wherein the at least one content item is determined based at least in part on the current location of the user.

9. The method of claim 3, wherein the at least one content item is determined based at least in part on a friend of the user in a social network.

10. The method of claim 3, wherein individual media items in the stream of media items are owned by the user and stored in a virtual file system associated with the user.

11. The method of claim 3, wherein at least one media item in the stream of media items is owned by the user and stored in a local file system of a client computing device associated with the user.

12. The method of claim 3, further comprising generating, in the at least one computing device, the user interface, wherein the user interface further includes at least one component configured to control playback of the stream of media items.

13. The method of claim 3, wherein the at least one entry includes a thumbnail image related to the at least one content item.

14. The method of claim 3, wherein the at least one content item corresponds to a network page describing a live event of the second performer associated with the media item.

15. A system, comprising:
at least one computing device;
a networked storage system executable in the at least one computing device, the networked storage system comprising:
logic that maintains a plurality of files in a plurality of virtual file systems that are individually associated with a respective user, at least some of the plurality of files corresponding to a plurality of media files owned by the respective user; and a media consumption interface executable in the at least one computing device, the media consumption interface comprising:
logic that sends at least two of the plurality of media files in one of the plurality of virtual file systems to a client associated with the respective user for playback in the client;
logic that identifies a current one of the plurality of media files being played in the client;
logic that determines at least one content item that is relevant to the current one of the plurality of media files;
logic that, in response to the current one of the plurality of media files playing in the client, sends an update to a relevant content listing rendered in the client, the update being configured to add at least one entry to the relevant content listing and being performed responsive to detecting that at least an interval of time has elapsed since the relevant content listing was previously updated, the at least one entry including a link to the at least one content item, the at least one entry in the relevant content listing being arranged in a time-based sequence such that the at least one entry correlates to a sequence of playback in the client of the plurality of media files from the one of the plurality of virtual file systems; and
logic that sends data implementing a media player user interface to the client, the media player user interface being configured to render the relevant content listing in a first panel and a media file playlist in a second panel.

16. The system of claim 15, wherein the at least one content item is determined based at least in part on a media consumption history of the respective user.

17. The system of claim 15, wherein the link corresponds to a network page having additional information regarding the at least one content item.

18. The system of claim 15, wherein the logic that sends the update is configured to delay sending the update to ensure a minimum time interval between updates.

19. The system of claim 15, wherein the media consumption interface further comprises logic that identifies a current location of the respective user, wherein the at least one content item is determined based at least in part on the current location of the user.

20. The system of claim 15, wherein the at least one content item corresponds to a news event regarding a performer associated with the current one of the plurality of media files.

21. The system of claim 15, wherein the at least one content item corresponds to a biography regarding a performer associated with the current one of the plurality of media files.

22. The system of claim 15, wherein the at least one content item corresponds to user-generated content.

23. The system of claim 15, wherein the at least one content item corresponds to content generated by a publisher of the current one of the plurality of media files.

* * * * *